(12) United States Patent
Chin (10) Patent No.: US 9,717,996 B1
(45) Date of Patent: Aug. 1, 2017

(54) SINGLE-SIDE-CLAMPED SLIDE

(71) Applicant: T.K. Chin Company Ltd., Taipei (TW)

(72) Inventor: Howard Chin, Taipei (TW)

(73) Assignee: T.K. Chin Company Ltd. (TW)

( * ) Notice: Subject to any disclaimer, the term of this patent is extended or adjusted under 35 U.S.C. 154(b) by 0 days.

(21) Appl. No.: 15/204,438

(22) Filed: Jul. 7, 2016

(30) Foreign Application Priority Data

Jun. 1, 2016 (TW) .............................. 105117290 A (51) Int. Cl.
| | | |
|---|---|---|
| *A63G 21/00* | (2006.01) | |
| *F16M 13/02* | (2006.01) | |
| *F16B 2/06* | (2006.01) | |
| *A63B 9/00* | (2006.01) | |

(52) U.S. Cl.
CPC .............. *A63G 21/00* (2013.01); *F16B 2/065* (2013.01); *F16M 13/022* (2013.01)

(58) Field of Classification Search
CPC .......... A63G 21/00; A63G 21/02; A63B 9/00; A63B 2009/006; E06C 7/00; E06C 7/086; E06C 7/08; H01R 4/64; H01R 4/66; H01R 11/12; H01R 12/724
USPC ............. 472/116–117, 128, 136; 482/35, 36; 439/433, 92
See application file for complete search history.

(56) References Cited

U.S. PATENT DOCUMENTS

| | | | | |
|---|---|---|---|---|
| 5,006,074 A | * | 4/1991 | Franks, Jr. ......... | B23K 37/0435 439/433 |
| 5,160,271 A | * | 11/1992 | Franks, Jr. ......... | B23K 37/0435 439/803 |
| 9,352,235 B1 | * | 5/2016 | Chin ....................... | A63G 21/00 |

* cited by examiner

*Primary Examiner* — Kien Nguyen
(74) *Attorney, Agent, or Firm* — Lerner, David, Littenberg, Krumholz & Mentlik, LLP (57) ABSTRACT

A single-side-clamped slide has a slide body and a fixing assembly. The fixing assembly has a connecting rod mounted on the slide body, and at least one clamping unit. Each clamping unit has a hook and an abutter mounted through and screwed with the hook. When in use, the clamping unit is mounted around a rear side of a tread of an open riser stairway, and abuts downward against a top surface of the tread. Then, the abutter is rotated until tightly abutting upward against a bottom of the tread, such that the clamping unit and the abutter securely clamp the tread. Therefore, the fixing assembly can be stably connected to the tread even though only clamping the rear side of the tread. In addition, the slide can be adapted to treads with different front-rear lengths since the fixing assembly only clamps one single side of the tread.

18 Claims, 7 Drawing Sheets

SINGLE-SIDE-CLAMPED SLIDE

CROSS-REFERENCE TO RELATED APPLICATIONS

The present application claims priority from Taiwan Patent Application No. 105117290 filed on Jun. 1, 2016, the disclosure of which is hereby incorporated herein by reference.

BACKGROUND OF THE INVENTION

1. Field of the Invention

The present invention relates to a slide for mounting on a stairway, especially to a single-side-clamped slide for an open riser stairway.

2. Description of the Prior Arts

Slides generally include the following two types: the type designed for standing on the ground alone and the type designed for mounting on a stairway. The latter is often for an open riser stairway, and may comprise a slide body and a fixing assembly. The slide body comprises a platform section and a slide section. The platform section is put on one of multiple treads of the open riser stairway. The fixing assembly is mounted securely on a bottom surface of the platform section, and clamps the tread front and rear to securely mount the slide body on said tread.

However, different stairways may have treads with different front-rear lengths. Thus, the fixing assembly has to comprise complicated structure to be adapted to treads with different front-rear lengths. But the more complicated the structure is, the higher the cost is, and the weaker the clamping force of the fixing assembly is. As a result, the conventional slide needs to be improved.

To overcome the shortcomings, the present invention provides a single-side-clamped slide to mitigate or obviate the aforementioned problems.

SUMMARY OF THE INVENTION

The main objective of the present invention is to provide a single-side-clamped slide that can be adapted to treads with different front-rear lengths, and can stably clamp the longer tread, and the whole structure is simplified with reduced cost.

The single-side-clamped slide has
a slide body having
a platform section; and
a slide section connected to the platform section, the slide section extending and inclined downward; and
a fixing assembly mounted on the platform section, and having
a connecting rod mounted securely on a bottom of the platform section, and extending horizontally; and
at least one clamping unit mounted securely on the connecting rod, and each one of the at least one clamping unit having
a hook connected to the connecting rod, and having
an upper clamping panel connected to the connecting rod;
a connecting panel connected to the upper clamping panel; and
a lower clamping panel connected to the connecting panel, arranged apart from the upper clamping panel, and having a threaded hole vertically formed through the lower clamping panel; and
an abutter mounted through and screwed with the threaded hole of the hook, and extending between the upper clamping panel and the lower clamping panel.

When the single-side-clamped slide is in use, the clamping unit is mounted around a rear side of the tread, and the upper clamping panel abuts downward against a top surface of the tread. Then, the abutter is rotated until the abutter tightly abuts upward against a bottom of the tread, such that the upper clamping panel and the abutter securely clamp the tread. Therefore, the fixing assembly can be stably connected to the tread even though the fixing assembly only clamps the rear side of the tread. In addition, the single-side-clamped slide can be adapted to treads with different front-rear lengths since the fixing assembly only clamps one single side of the tread. The single-side-clamped slide can achieve the abovementioned functions and advantages merely by the clamping unit and the abutter. Thus, the whole structure is simplified, and the cost can be reduced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
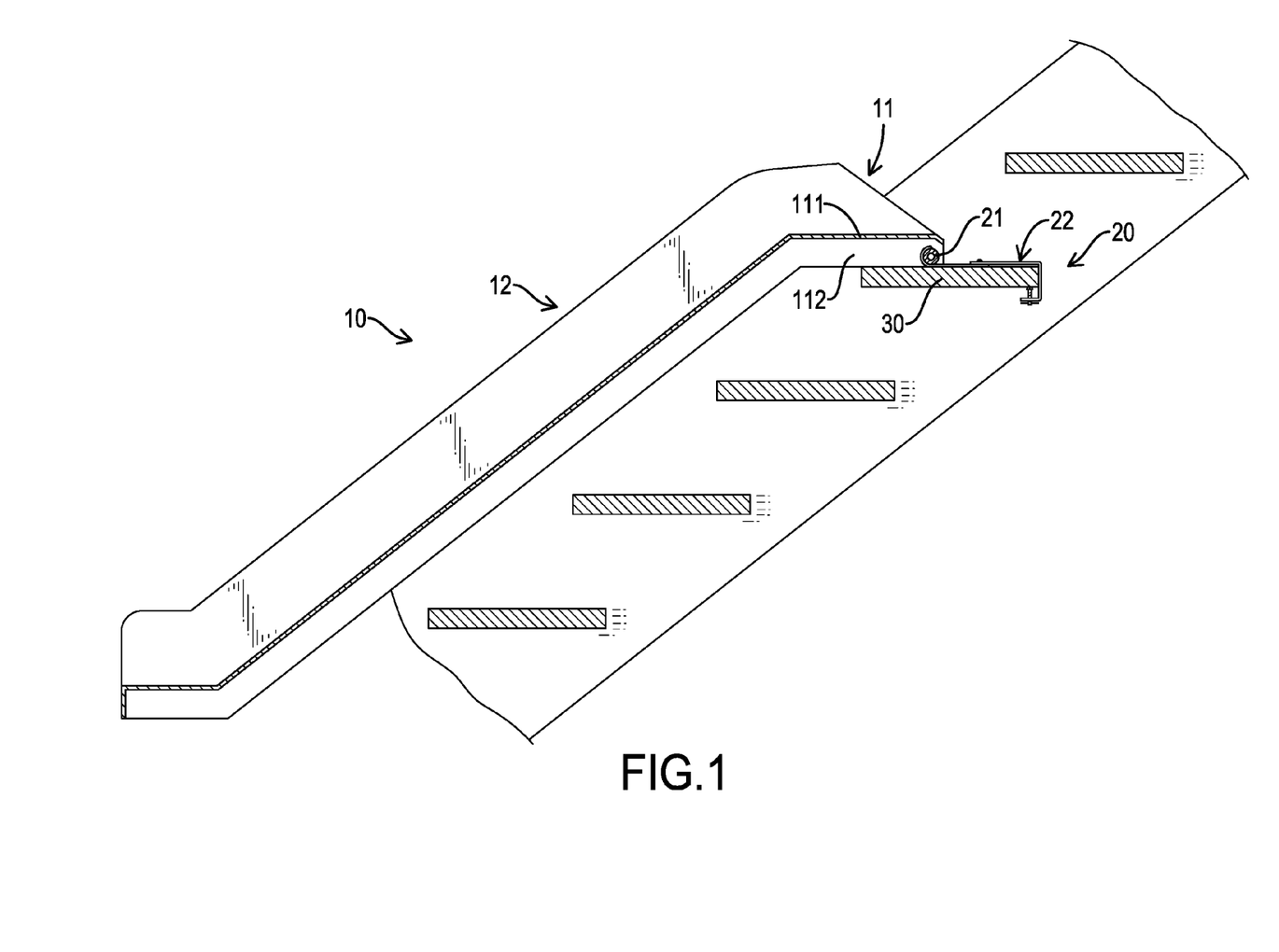
FIG. 1 is a side view of a first embodiment of a single-side-clamped slide in accordance with the present invention, shown mounted on a stairway.

With reference to FIG. 1, a first embodiment of a single-side-clamped slide in accordance with the present invention comprises a slide body 10 and a fixing assembly 20.

Figure 2:
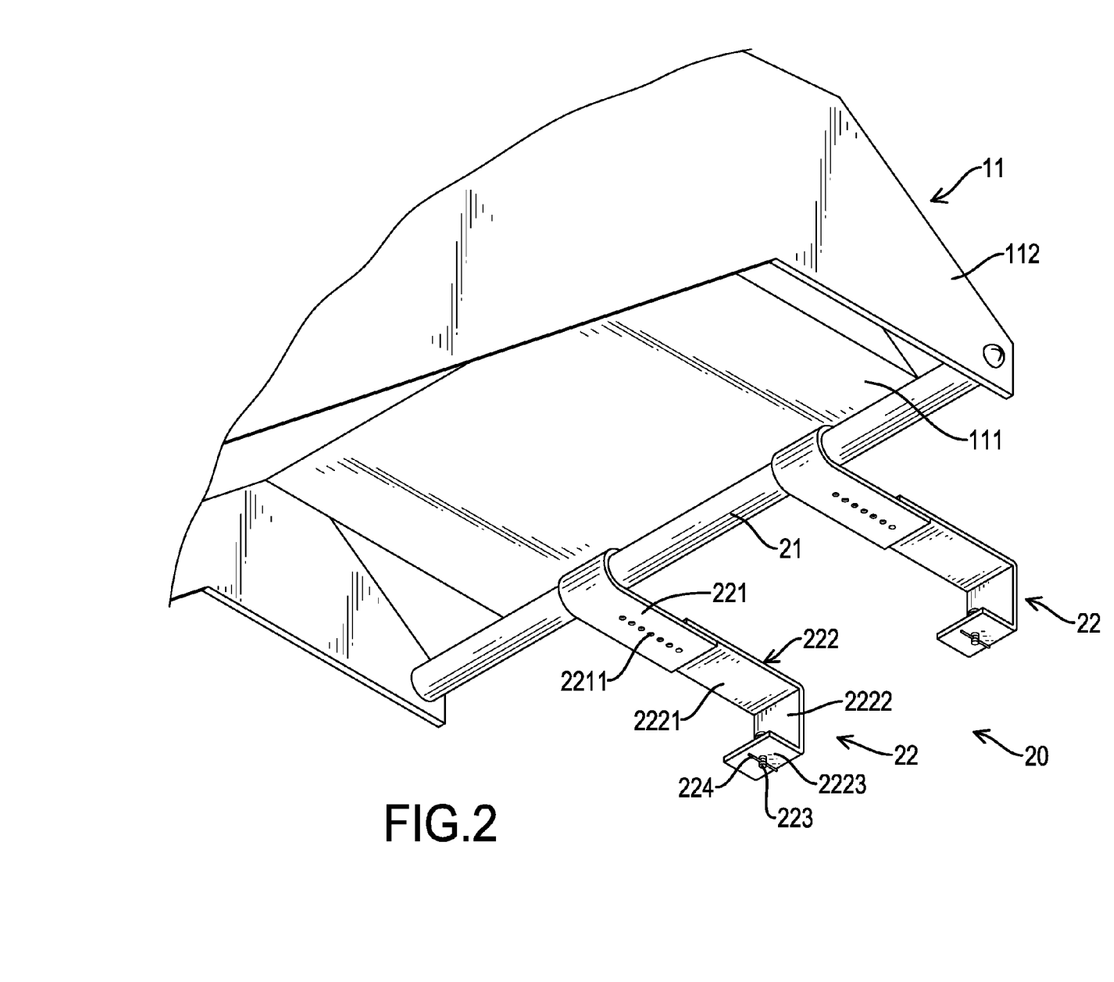
FIG. 2 is a partial perspective view of the single-side-clamped slide in FIG. 1.

With reference to FIGS. 1 and 2, the slide body 10 has a platform section 11 and a slide section 12. The platform section 11 has a platform 111 and two side walls 112. The two side walls 112 are vertically and securely mounted on two transverse sides of the platform 111 and extend downward. The slide section 12 is connected to the platform section 11 and extends and is inclined downward from a front side of the platform section 11. In a preferred embodiment, the slide section 12 is preferably, but not limited to, formed integrally. The slide section 12 also may comprise multiple separate parts for users to assemble depending on the desired length.

Figure 3:
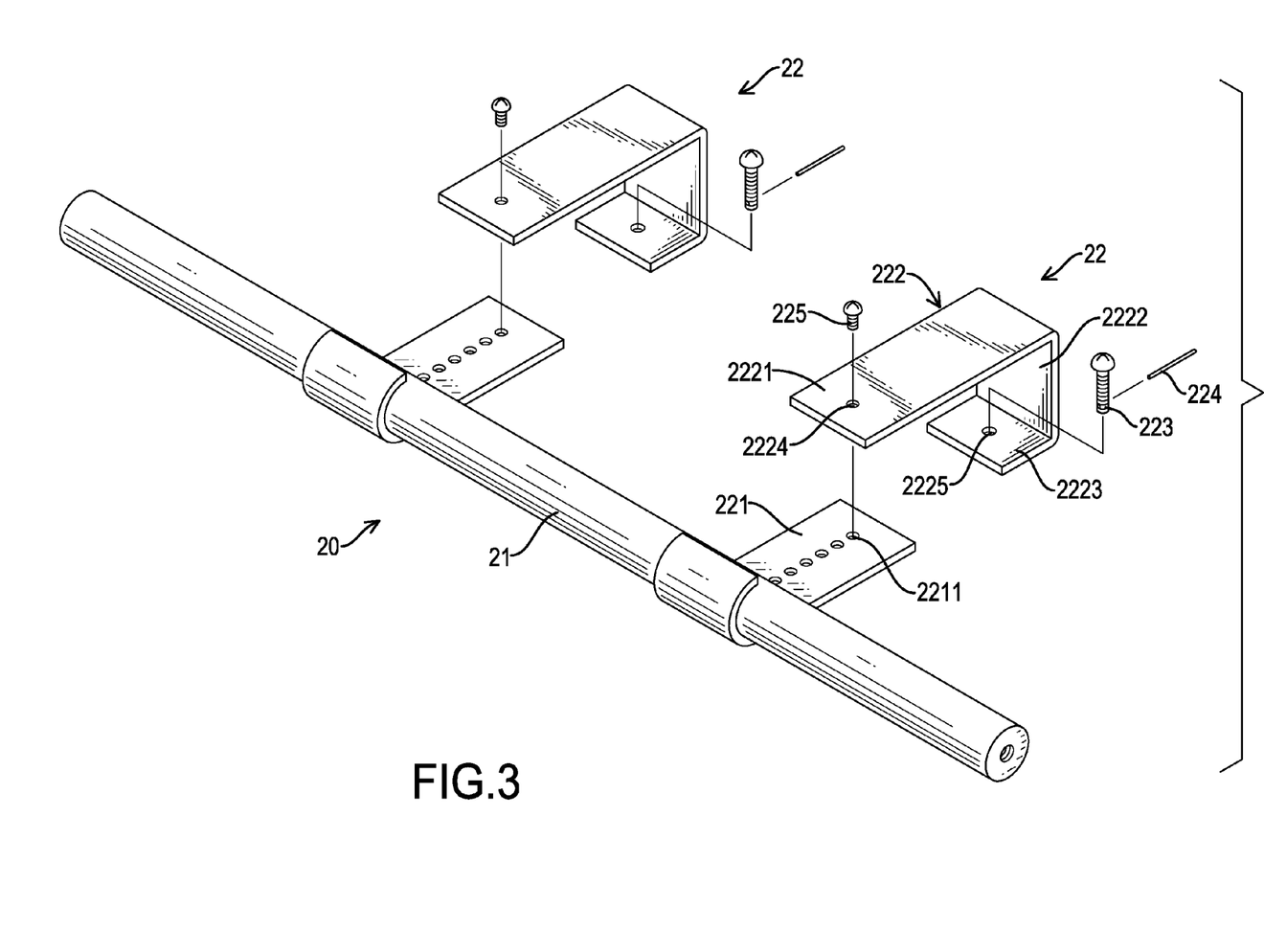
FIG. 3 is an exploded perspective view of a fixing assembly of the single-side-clamped slide in FIG. 1.
Figure 4:
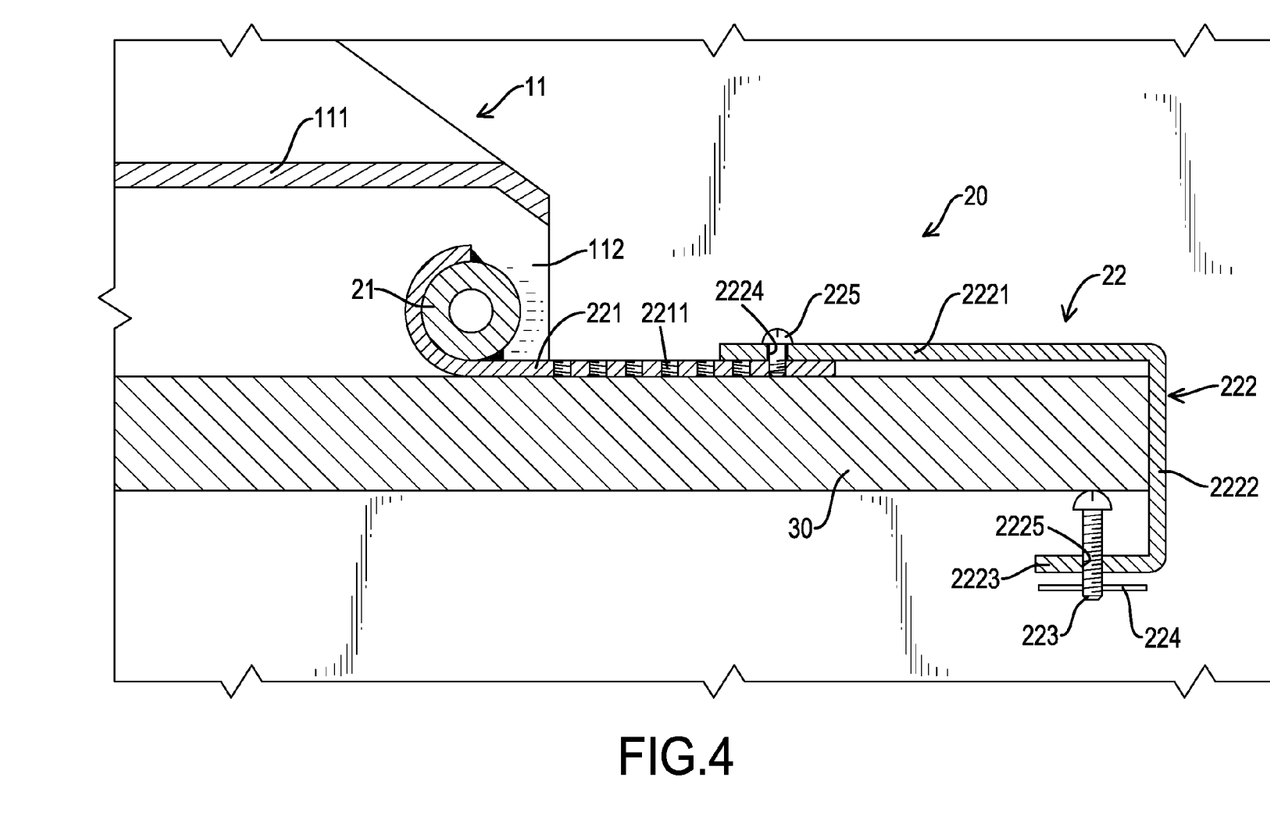
FIG. 4 is an enlarged side view in partial section of the single-side-clamped slide in FIG. 1, shown mounted on the stairway.

With reference to FIGS. 2 to 4, the fixing assembly 20 is mounted on the platform section 11 of the slide body 10, and has a connecting rod 21 and two clamping units 22. The connecting rod 21 is mounted securely on a bottom of the platform section 11 and extends horizontally. In a preferred embodiment, two ends of the connecting rod 21 are respectively and securely mounted on the two side walls 112 of the platform section 11.

The two clamping units 22 are mounted securely on the connecting rod 21, and are transversely arranged apart from each other. Each clamping unit 22 has an adjuster 221, a hook 222, a positioning unit 225, an abutter 223, and a pin 224. The adjuster 221 is mounted securely on the connecting rod 21. In a preferred embodiment, a curved portion of the adjuster 221 is attached and soldered securely to an outer surface of the connecting rod 21, and the curved portion extends for about 180 degrees. But the connection between the adjuster 221 and the connecting rod 21 is by no means limited by the abovementioned. The adjuster 221 has multiple first positioning holes 2211. The first positioning holes 2211 are vertically formed through the adjuster 221, and are arranged front-to-rear apart from each other.

The hook 222 is moveably connected to the adjuster 221, such that the hook 222 is indirectly connected to the connecting rod 21. The hook 222 has an upper clamping panel 2221, a connecting panel 2222, and a lower clamping panel 2223. The upper clamping panel 2221 is moveably attached to the adjuster 221, such that the upper clamping panel 2221 is indirectly connected to the connecting rod 21. The connecting panel 2222 is connected to the upper clamping panel 2221. The lower clamping panel 2223 is connected to the connecting panel 2222 and is arranged apart from the upper clamping panel 2221. In a preferred embodiment, the upper clamping panel 2221 and the lower clamping panel 2223 are parallel with each other, and the connecting panel 2222 is perpendicular to the upper clamping panel 2221 and the lower clamping panel 2223. But the structure of the hook 222 is by no means limited by the abovementioned. The upper clamping panel 2221 has a second positioning hole 2224, and the second positioning hole 2224 is vertically formed through the upper clamping panel 2221. The positioning unit 225 is detachably mounted securely in the second positioning hole 2224 and one of the first positioning holes 2211 of the adjuster 221, such that the relative position between the adjuster 221 and the hook 222 is adjustable. In a preferred embodiment, the positioning unit 225 is a screw, and the first positioning holes 2211 are threaded holes. But the positioning unit 225 and the first positioning holes 2211 are by no means limited by the abovementioned.

The lower clamping panel 2223 has a threaded hole 2225 vertically formed through the lower clamping panel 2223. The abutter 223 is mounted through and screwed with the threaded hole 2225 of the hook 222, and extends between the upper clamping panel 2221 and the lower clamping panel 2223. The pin 224 is disposed below the lower clamping panel 2223 and is transversely mounted through the abutter 223, thereby facilitating ease in rotating the abutter 223 by user's fingers. But in another preferred embodiment, the clamping unit 22 may be implemented without the pin. Instead, a bottom end of the abutter 223 is formed in a shape that is easy to hold and rotate by fingers.

When the single-side-clamped slide as mentioned above is in use, the hook 222 is mounted around a rear side of a tread 30 of a stairway, the rear side of the tread 30 abuts against the connecting panel 2222, and the adjuster 221 abuts downward against a top surface of the tread 30. Then, the abutter 223 is rotated until the abutter 223 tightly abuts upward against a bottom of the tread 30, such that the adjuster 221 and the abutter 223 securely clamp the tread 30 to securely mount the slide body 10 on the tread 30 via the fixing assembly 20.

In addition, the single-side-clamped slide can be adapted to treads 30 with different front-rear lengths since the single-side-clamped slide only clamps one single side of the tread 30. However, when installed with a relative longer tread 30, the relative position between the hook 222 and the adjuster 221 is adjustable to enlarge the abutted area of the tread 30 that is abutted by the adjuster 221 and the hook 222, such that the single-side-clamped slide can stably clamp the longer tread 30.

The single-side-clamped slide can achieve the abovementioned functions and advantages merely by the adjuster 221, the hook 222 and the abutter 223. Thus, the whole structure is simplified, and the cost can be reduced.

Figure 5:
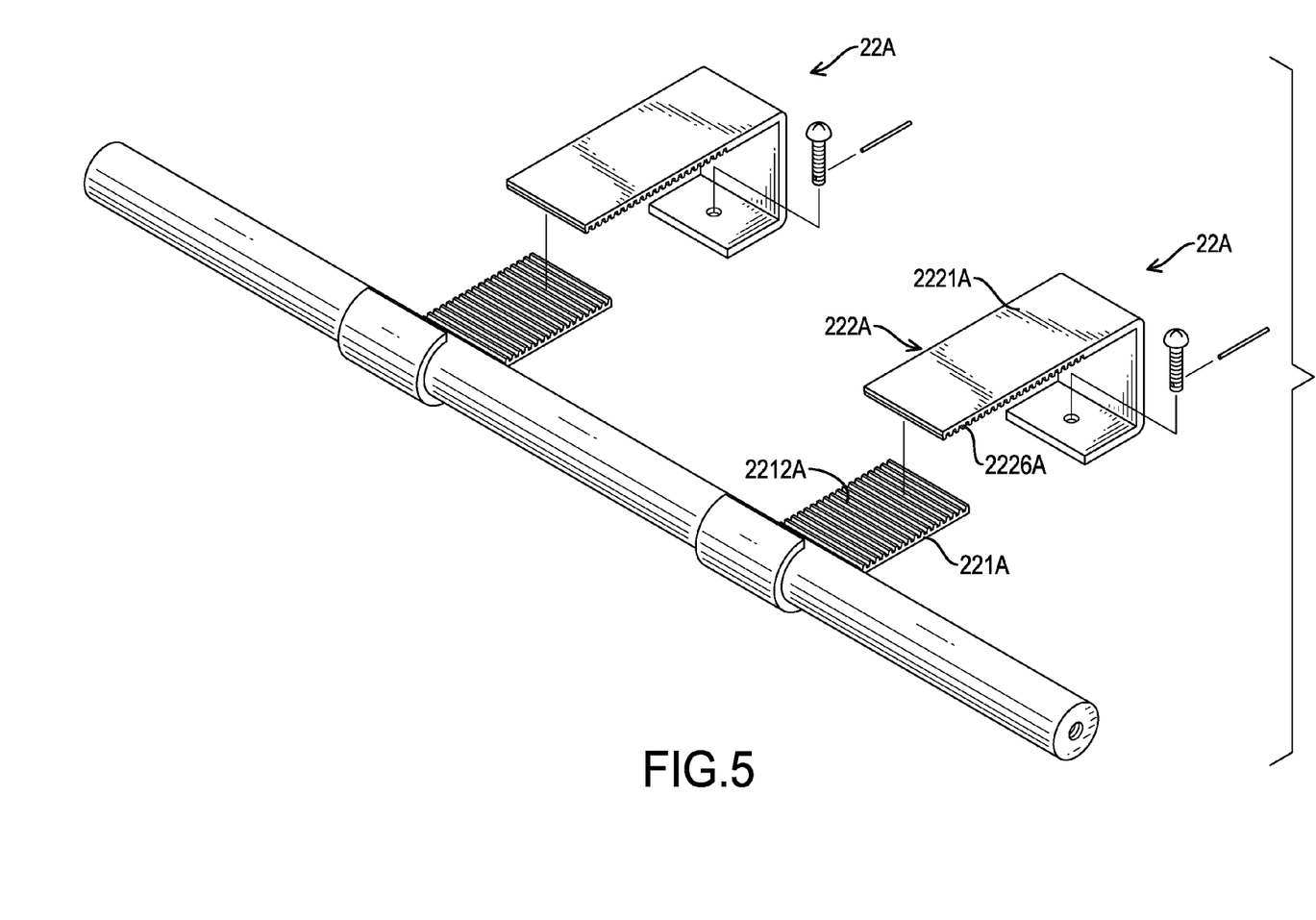
FIG. 5 is an exploded perspective view of the fixing assembly of a second embodiment of a single-side-clamped slide in accordance with the present invention.
Figure 6:
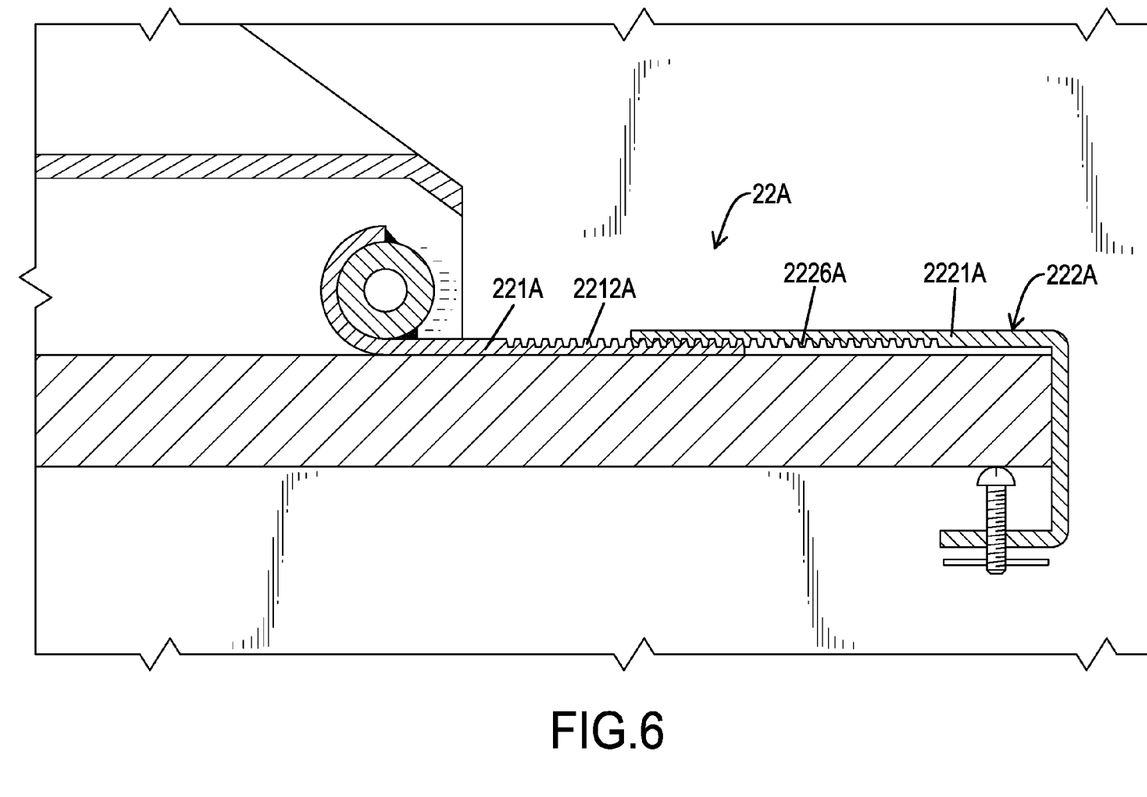
FIG. 6 is an enlarged side view in partial section of the single-side-clamped slide in FIG. 5, shown mounted on the stairway.

With reference to FIGS. 5 and 6, a second embodiment of the single-side-clamped slide in accordance with the present invention is substantially similar to the first embodiment mentioned above, but in the second embodiment, the clamping unit 22A has no positioning unit, the adjuster 221A has no first positioning hole, and the upper clamping panel 2221A of the hook 222A has no second positioning hole. Instead, the adjuster 221A has a first gear rack 2212A formed on a top surface of the adjuster 221A. Teeth of the first gear rack 2212A are arranged front-to-rear apart from each other. The upper clamping panel 2221A of the hook 222A has a second gear rack 2226A. The second gear rack 2226A is formed on a bottom surface of the upper clamping panel 2221A and selectively engages with the first gear rack 2212A. Teeth of the second gear rack 2226A are arranged front-to-rear apart from each other. In a preferred embodiment, the teeth of the first gear rack 2212A are rough in surface, and the teeth of the second gear rack 2226A are also rough in surface, thereby enhancing the engagement strength to avoid transverse displacement between the adjuster 221A and the hook 222A.

In the second embodiment, the relative position between the hook 222A and the adjuster 221A is also adjustable by altering the overlapping area between the first gear rack 2212A and the second gear rack 2226A.

Figure 7:
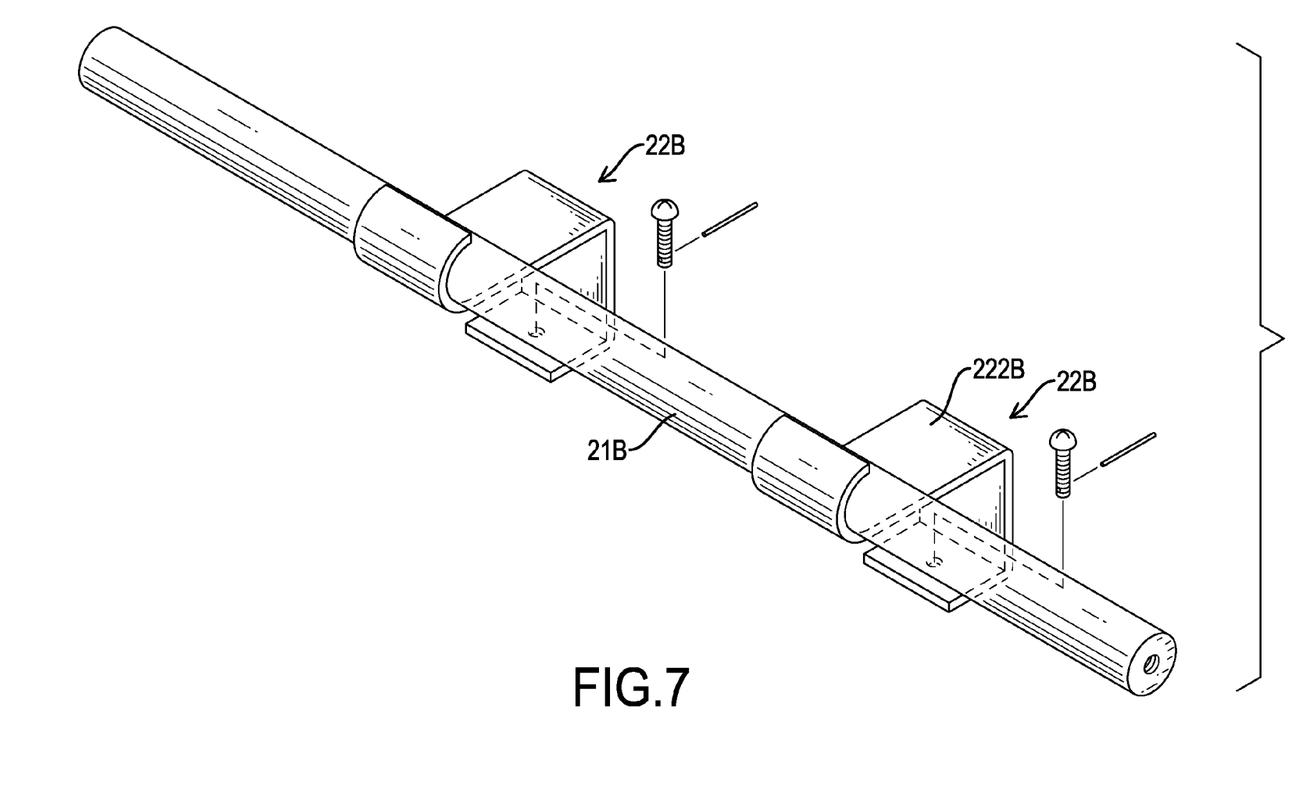
FIG. 7 is a perspective view of the fixing assembly of a third embodiment of a single-side-clamped slide in accordance with the present invention.

With reference to FIG. 7, a third embodiment of the single-side-clamped slide in accordance with the present invention is substantially similar to the second embodiment mentioned above, but in the third embodiment, the clamping unit 22B has no adjuster. Instead, the hook 222B is mounted securely on the connecting rod 21B. In a preferred embodiment, a curved portion of the hook 222B is attached and soldered securely to the outer surface of the connecting rod 21B, and the curved portion extends for about 180 degrees. But the connection between the hook 222B and the connecting rod 21B is by no means limited by the abovementioned.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A single-side-clamped slide comprising:
   a slide body having
      a platform section; and a slide section connected to the platform section, the slide section extending and inclined downward; and a fixing assembly mounted on the platform section, and having a connecting rod mounted securely on a bottom of the platform section, and extending horizontally; and at least one clamping unit mounted securely on the connecting rod, and each one of the at least one clamping unit having a hook connected to the connecting rod, and having an upper clamping panel connected to the connecting rod;

a connecting panel connected to the upper clamping panel; and a lower clamping panel connected to the connecting panel, arranged apart from the upper clamping panel, and having a threaded hole vertically formed through the lower clamping panel; and an abutter mounted through and screwed with the threaded hole of the hook, and extending between the upper clamping panel and the lower clamping panel.

2. The single-side-clamped slide as claimed in claim 1, wherein the hook of the at least one clamping unit is mounted securely on the connecting rod.

3. The single-side-clamped slide as claimed in claim 2, wherein a curved portion of the hook of the at least one clamping unit is attached securely to an outer surface of the connecting rod.

4. The single-side-clamped slide as claimed in claim 3, wherein each one of the at least one clamping unit has a pin disposed below the lower clamping panel and mounted through the abutter.

5. The single-side-clamped slide as claimed in claim 3, wherein the platform section of the slide body has a platform; and two side walls vertically and securely mounted on two transverse sides of the platform and extending downward; and two ends of the connecting rod of the fixing assembly respectively and securely mounted on the two side walls.

6. The single-side-clamped slide as claimed in claim 1, wherein each one of the at least one clamping unit comprises an adjuster mounted securely on the connecting rod, and the hook moveably connected to the adjuster.

7. The single-side-clamped slide as claimed in claim 6, wherein the adjuster of each one of the at least one clamping unit has multiple first positioning holes vertically formed through the adjuster, and arranged front-to-rear apart from each other;

the upper clamping panel of the hook has a second positioning hole vertically formed through the upper clamping panel; and each one of the at least one clamping unit has a positioning unit detachably mounted securely in the second positioning hole and one of the first positioning holes.

8. The single-side-clamped slide as claimed in claim 7, wherein a curved portion of the adjuster of each one of the at least one clamping unit is attached securely to an outer surface of the connecting rod.

9. The single-side-clamped slide as claimed in claim 8, wherein each one of the at least one clamping unit has a pin disposed below the lower clamping panel and mounted through the abutter.

10. The single-side-clamped slide as claimed in claim 9, wherein the platform section of the slide body has a platform; and two side walls vertically and securely mounted on two transverse sides of the platform and extending downward; and two ends of the connecting rod of the fixing assembly respectively and securely mounted on the two side walls.

11. The single-side-clamped slide as claimed in claim 6, wherein the adjuster of each one of the at least one clamping unit has a first gear rack formed on a top surface of the adjuster, and teeth of the first gear rack arranged front-to-rear apart from each other; and the upper clamping panel of the hook has a second gear rack formed on a bottom surface of the upper clamping panel, selectively engaging with the first gear rack, and teeth of the second gear rack arranged front-to-rear apart from each other.

12. The single-side-clamped slide as claimed in claim 11, wherein the teeth of the first gear rack are rough in surface, and the teeth of the second gear rack are rough in surface.

13. The single-side-clamped slide as claimed in claim 12, wherein a curved portion of the adjuster of each one of the at least one clamping unit is attached securely to an outer surface of the connecting rod.

14. The single-side-clamped slide as claimed in claim 13, wherein each one of the at least one clamping unit has a pin disposed below the lower clamping panel and mounted through the abutter.

15. The single-side-clamped slide as claimed in claim 14, wherein the platform section of the slide body has a platform; and two side walls vertically and securely mounted on two transverse sides of the platform and extending downward; and two ends of the connecting rod of the fixing assembly respectively and securely mounted on the two side walls.

16. The single-side-clamped slide as claimed in claim 6, wherein a curved portion of the adjuster of each one of the at least one clamping unit is attached securely to an outer surface of the connecting rod.

17. The single-side-clamped slide as claimed in claim 1, wherein each one of the at least one clamping unit has a pin disposed below the lower clamping panel and mounted through the abutter.

18. The single-side-clamped slide as claimed in claim 1, wherein the platform section of the slide body has a platform; and two side walls vertically and securely mounted on two transverse sides of the platform and extending downward; and two ends of the connecting rod of the fixing assembly respectively and securely mounted on the two side walls.

\* \* \* \* \*